United States Patent [19]

Rehder et al.

[11] Patent Number: 4,586,148

[45] Date of Patent: Apr. 29, 1986

[54] ARRANGEMENT FOR SCANNING PRINTING PLATES

[75] Inventors: Jurgen Rehder, Waldmohr; Siegfried Schuhmann, Offenbach am Main; Gerd Steiner, Heusenstamm, all of Fed. Rep. of Germany

[73] Assignee: M.A.N.-Roland Druckmaschinen Aktiengesellschaft, Fed. Rep. of Germany

[21] Appl. No.: 500,612

[22] Filed: Jun. 3, 1983

[30] Foreign Application Priority Data

Jun. 3, 1982 [DE] Fed. Rep. of Germany ....... 3220800

[51] Int. Cl.[4] ........................ B41M 1/00; G06F 15/40

[52] U.S. Cl. ................................ 364/550; 101/450.1; 101/DIG. 25; 358/107; 364/519

[58] Field of Search .................. 250/208, 239, 237 R, 250/578, 560; 101/DIG. 24–26; 358/101, 107; 364/550, 519, 520; 356/339, 445

[56] References Cited

U.S. PATENT DOCUMENTS

| | | | |
|---|---|---|---|
| 3,650,204 | 3/1972 | Burger et al. | 101/45 |
| 3,671,128 | 6/1972 | Radke et al. | 356/339 |
| 3,898,928 | 8/1975 | Kaneko | 101/132.5 |
| 3,958,509 | 5/1976 | Murray et al. | 101/426 |
| 3,965,356 | 6/1976 | Howarth | 250/578 |
| 4,041,286 | 8/1977 | Sanford | 358/107 |
| 4,082,039 | 4/1978 | Schutt et al. | 101/450 |
| 4,149,187 | 10/1979 | Palmer et al. | 358/107 |
| 4,200,932 | 4/1980 | Schramm et al. | 364/519 |
| 4,233,663 | 11/1980 | Sugawara et al. | 364/515 |
| 4,384,337 | 5/1983 | Mamberer et al. | 364/550 |
| 4,406,545 | 9/1983 | Montone et al. | 250/560 |
| 4,441,819 | 4/1984 | Takeuchi et al. | 356/445 |

FOREIGN PATENT DOCUMENTS

| | | | |
|---|---|---|---|
| 2355072 | 5/1978 | Fed. Rep. of Germany . | |
| 3029273 | 2/1981 | Fed. Rep. of Germany . | |
| 2022514 | 12/1979 | United Kingdom | 101/DIG. 24 |

*Primary Examiner*—Errol A. Krass
*Attorney, Agent, or Firm*—Leydig, Voit & Mayer

[57] ABSTRACT

A machine for scanning printing plates to determine the ratio of "printing" to "non-printing" area for pre-adjustment of the ink dosing elements of a printing machine has an array of electronic photo-sensors, each sensor being disposed in a channel having low-reflection chambers which permit sharp delimination of resolution elements on the printing plate and ensure high definition scanning of different types of printing plates under practical conditions. Preferably the diaphragms dividing the channel into chambers have greater spacing at greater distances from the element sensed on the printing plate. To accommodate printing plates of different materials, means are provided for selecting the wave length of the light source. To prevent measurement error due to changes in the distance from the printing plate to the light source and sensor array, the photosensor array is preferably directed or aimed 60° to 45° with respect to the normal vector of the printing plate, and the light source is in the same quadrant as the photo-sensor array at an angle of 0° to 45° with respect to the normal vector. Automatic calibration, automatic printing plate size determination, automatic sensing of identification information engraved on the printing plate, and a stairstep scan to increase the scanning rate are provided by suitable procedures executed by a microcomputer controlling the scanning process and analyzing, adjusting, and interpreting data received from the sensor array.

17 Claims, 12 Drawing Figures

FIG. 5.
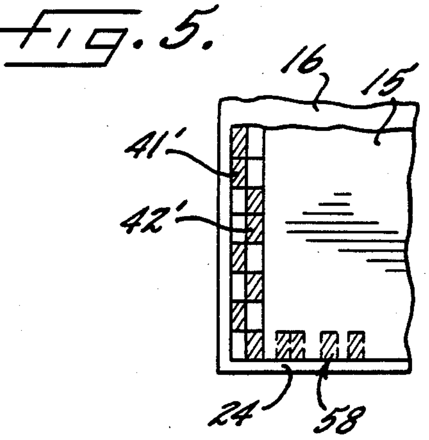
FIG. 7.
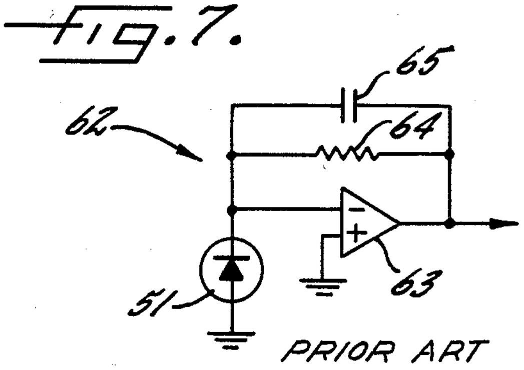
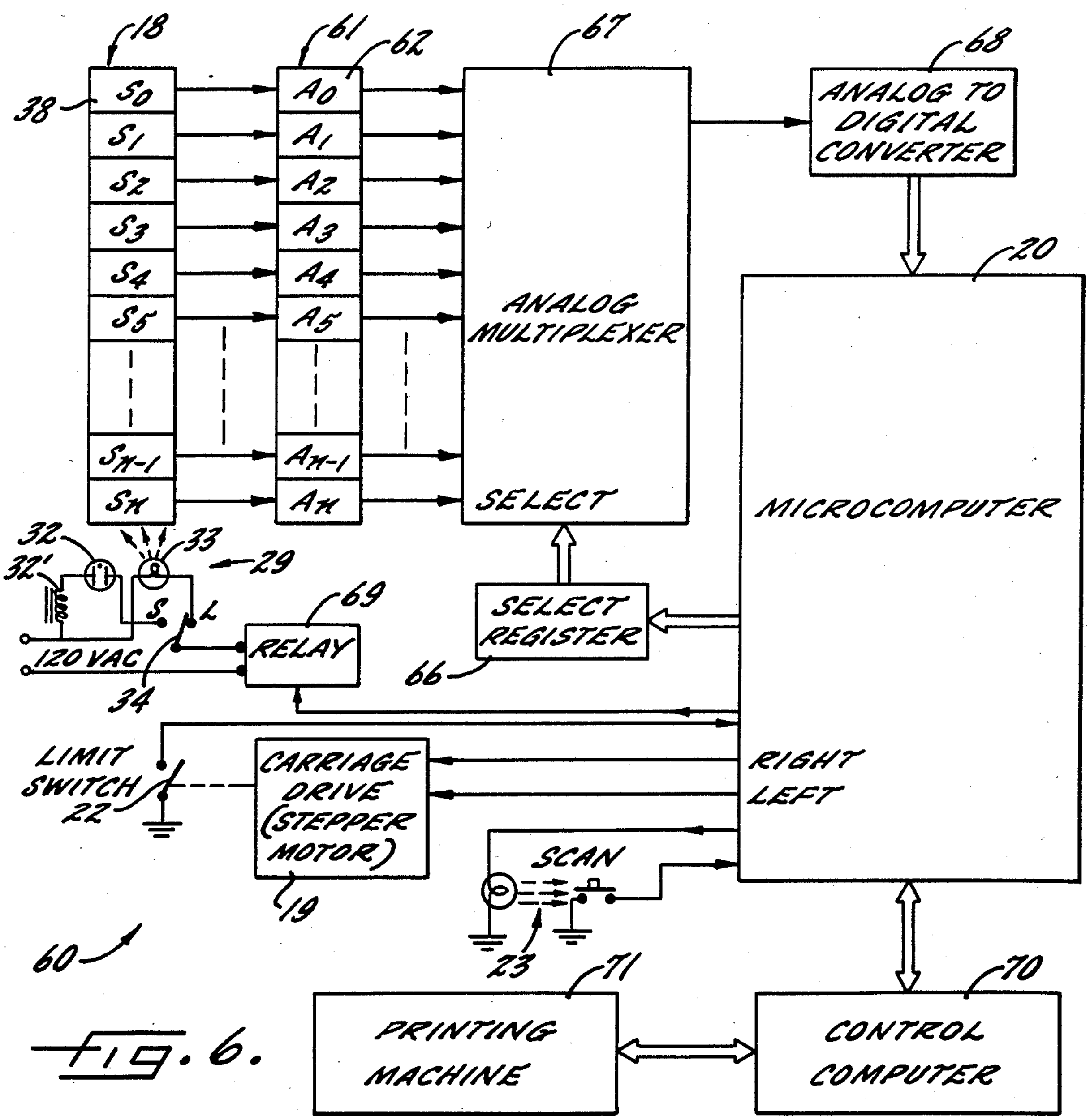
FIG. 6.

ARRANGEMENT FOR SCANNING PRINTING PLATES

BACKGROUND OF THE INVENTION

This invention relates to an optical scanner for sensing the ratio of the "printing" to the "non-printing" area on a printing plate for automatic computer-controlled preadjustment of the ink metering elements for the printing zones in a printing machine.

Currently printing machines are operated under remote control by a central control computer accessed by a control terminal. The printing machine has several ink-dosing elements arranged across the width of the printing machine for dosing the application of ink to a printing plate, and the ink-dosing elements are individually adjustable by remote control adjusting devices. Before any sheets are fed through the printing machine, the ink dosing elements are adjusted to predetermined set points, and after several test sheets are printed, the ink densities of several control areas on the printed sheets are measured by a scanning device. A computer control compares the measured ink densities to desired ink densities in order to more precisely adjust the ink dosing elements. Such a system is described in Schramm et al. U.S. Pat. No. 4,200,932 issued Apr. 29, 1980, for which a reexamination certificate issued Apr. 26, 1983.

In order to speed up the automatic adjustment of the ink dosing elements, it is known that the ratio of the "printing" to the "non-printing" area on the printing plate, for each strip-shaped inking zone dependent on the printing press, should be determined so that the initial set points for the ink dosing elements may be determined or adjusted in accordance with that ratio. In order to determine the ratios of the "printing" to the "non-printing" area on the printing plate for the ink zones of the printing press, it is known to provide an array of photo-sensing elements along one dimension of the printing plate, which received the light of a light source reflected by the printing plate. Means are provided for relative movement of the light source and array of photo-sensing elements along the second dimension of the printing plate. As the array of photo-sensing elements scans across the printing plate, the reflected light received by each photo-sensing element is measured and recorded in a computer which is programmed to calculate the ratio of the "printing" to "non-printing" area on the printing plate for the inking zones of the printing press. Such an arrangement for scanning printing plates is described in West German Pat. No. 3,029,273.

SUMMARY OF THE INVENTION

The inventors desire an arrangement for scanning printing plates of different types such as aluminum plates and chromium copper plates of various sizes for use in conjunction with different printing presses having various inking zone widths. But to accommodate these different plate types, it is necessary to measure the printing plates in a scanner having a sufficiently fine grid of resolution elements. Each resolution element corresponds to the effective area on the printing plate independently sensed by an individual sensor at generally discrete points in time. A desired value for the ratio of the total printing plate area to the area of a single resolution element is on the order of 50,000:1.

However, a prerequisite for the use of such a high resolution or fine grid is effective exclusion of light from outside of each resolution element from being received by the photo-sensing element directed to and sensing the resolution element. In other words, at any given time that a photo-sensing element is active, it must be responsive only to the light reflected from the associated resolution element on the printing plate. In addition, the sensing of light reflected from the individual resolution elements must not be falsified by changes in the distance of the printing plate to the light source and photo-sensing element. In practice, however, a printing plate may exhibit deformations causing up to 10 mm changes in the distance. Although these deformations could be eliminated by adhesion of the printing plate to a flat base by suction, the required degree of suction is expensive to obtain and does not always solve the problem of printing plate deformations.

Hence, the primary object of the invention is to provide an improved arrangement for scanning printing plates having a fine grid of sharply defined or delimited resolution elements. Moreover, the printing plate still must be scanned in a reasonable length of time and hence at an increases scanning rate in terms of resolution elements per unit time.

Another object of the invention is to reduce measurement errors due to changes in the distance from the printing plate to the light source and sensor array, such as are caused by deformation of the printing plate.

Yet another object of the invention is to accommodate printing plates made of different materials and of different sizes for use on printing machines having various widths of ink zones.

Still another object of the invention is to provide automatic calibration of each sensor element and the light source.

Moreover, it is an object of the invention to provide automatic sensing of the size of the printing plate in order to speed up the scanning process.

And still another object of the invention is to provide automatic sensing of printing plate identification information engraved on the printing plate.

In order to achieve the above described objects, the photo-sensing elements comprise chambers equipped with diaphragms arranged in front of electronic photo-sensing devices. The definition of the resolution elements is further increased by increasing the diaphragm spacing at greater distances from the resolution elements on the printing plate. To accommodate printing plates of different materials, means are provided for selecting the wave length of the light source. To prevent measurement error due to changes in the distance from the printing plate to the light source and sensor array, the photo-sensor array is preferably directed or aimed 60° to 45° with respect to the normal vector of the printing plate, and the light source is in the same quadrant as the photo-sensor array at an angle of zero to 45° with respect to the normal vector of the printing plate. Automatic calibration, automatic size determination, automatic sensing of identification information engraved on the printing plate, and a stairstep scan to increase the scanning rate are provided by suitable procedures executed by a microcomputer controlling the scanning process and analyzing, adjusting, and interpreting data received from the array of sensing elements.

BRIEF DESCRIPTION OF THE DRAWINGS

Other objects and advantages of the invention will become apparent upon reading the following detailed description and upon reference to the drawings in which:

FIG. 5 is a preferred embodiment for the automatic calibration and identification information inscribed on the printing plate;

FIG. 6 is a block diagram of the control electronics for the scanner according to the invention;

FIG. 7 is a conventional schematic for the amplifier provided for each photo-sensing element;

Figure 1:
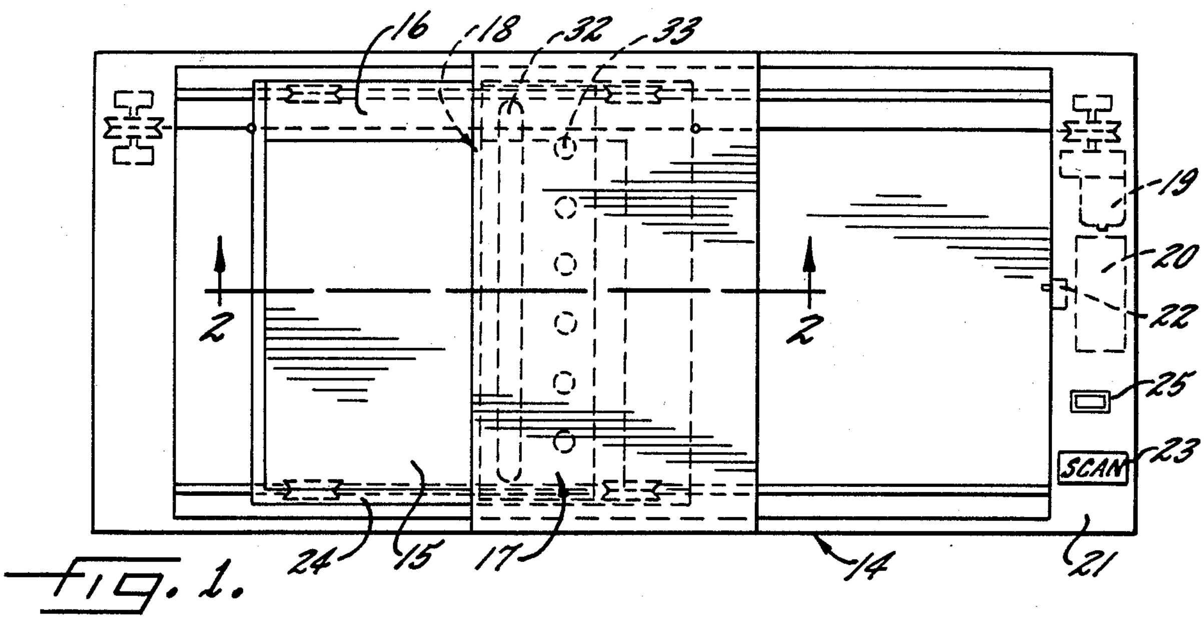
FIG. 1 is a plan view of a scanner according to the invention.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

BEST MODE FOR PRACTICING INVENTION

Turning now to the drawings, there is shown in FIG. 1 a plan view of the scanner according to the invention, generally designated 14. The printing plate 15 is mounted on a carriage 16 and is moved under a stationary scanning assembly generally designated 17 including a sensor array 18. A stepper motor 19 under control of a microcomputer 20 drives the carriage 17 from a rightmost position to a leftmost position with respect to the base 21 of the scanner 14. Initially the microcomputer 20 drives the carriage 16 to its rightmost position, the position being detected by a limit switch 22. Then a scan switch 23 is illuminated to tell the operator to place the printing plate 16 on the carriage 17. A lay or guide 24 is provided on top of the carriage 16 for receiving longitudinal and transverse edges of the printing plate 15. Once the printing plate 15 has been placed in alignment on the carriage 16, the operator depresses the scan switch 23 to start the scanning process. The microcomputer 20 activates the stepper motor 19 to drive the carriage 16 from its rightmost position to its leftmost position. The position of the carriage 16 in FIG. 1, for example, corresponds to the end of the scanning process. As the carriage 16 is driven leftward, successive portions of the printing plate 15 are scanned by the photo-sensor array 18 and the measured values from the sensor array 18 are received and analyzed by the microcomputer 20. The microcomputer 20 detects the end of the scanning process and thereupon commands the stepper motor 19 to return the carriage 16 to its rightmost position. The limit switch 22 signals the microcomputer 20 that the carriage has returned and thereupon the microcomputer 20 illuminates the scan switch 23 to tell the operator that the scanning process is finished so that the printing plate 15 may be removed and, if desired, replaced with a new printing plate.

Figure 2:
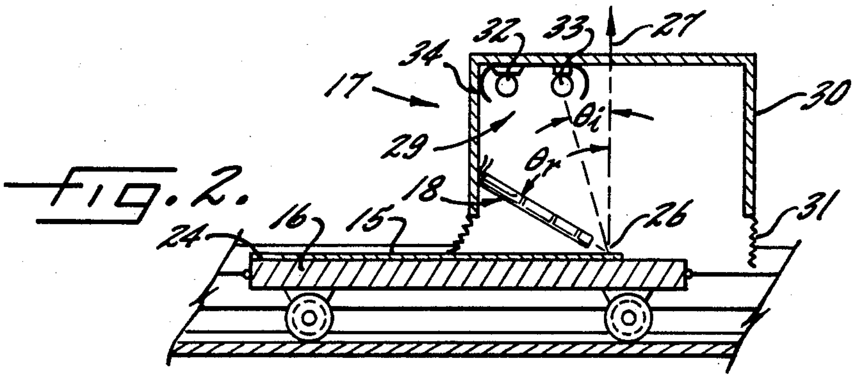
FIG. 2 is a cross-sectional view of the scanner of FIG. 1 along section line 2—2 showing the relationship between the light source, the printing plate, and the photo-sensing array.

Further details of the scanning process are illustrated in FIG. 2. The photo-sensor array 18 is responsive to light reflected from a narrow longitudinal strip of resolution elements 26 on the surface of the printing plate 15. The photosensor array 18 is planar in form and oriented at an angle of reflection $\theta_r$ with respect to the normal vector 27 of the printing plate 15 at the point of reflection 26. Light is provided by a source generally designated 29 within a cover or hood 30 enclosing the sensor assembly 17. The point of reflection 26 is illuminated by the light source 29 at an angle of incidence $\theta_i$ with respect to the normal vector 27. The cover 30 and associated drapes 31 prevent external light from illuminating the strip of resolution elements or reflection point 26.

In accordance with one aspect of the present invention, the photo-sensor array 18 is directed at an angle of reflection $\theta_r$ within the range of 60° to 45°, and the light source 29 is in the same quadrant with respect to the plane of the printing plate 15 and the normal vector 27. Preferably, the angle of incidence $\theta_i$ is within the range of 0° to 45°. Such an arrangement between the photo-sensing array 18, the printing plate 15, and the light source 29 has proved to be advantageous for reducing variations due to changes in the distance of a printing plate with respect to the sensor array 18 and light source 29 caused, for example, by deformations of the printing plate.

According to another feature of the present invention, the wave length of the light source is chosen to improve the measurement of different printing plates. A short-wave gas discharge lamp 32, for example, is preferred for scanning an aluminum printing plate 15. Long wave incandescent lamps 33, however, are preferred for scanning a copper/chromium printing plate 15. A switch 34 permits the operator to select either the long wave length source 33 or the short wave length source 32. By undertaking the scanning of the printing plate 15 in a limited optical spectrum, the optical scanning can be improved by matching the spectral maxima of the light source with the wave length at which the light is preferentially reflected by the printing plate 15. Alternatively optical filters could be used to select the wave length of the light source 29 received by the sensor array 18. Preferably the optical system is designed to maximize the amount of light collected by the sensor array 18. A reflector 34 may also be used to provide additional light paths from the lamps 32, 33 to the sensor array 18 and to compensate for changes in intensity due to variations in the distance from the printing plate 15 and the sensor array 18 and source 29.

Figure 3:
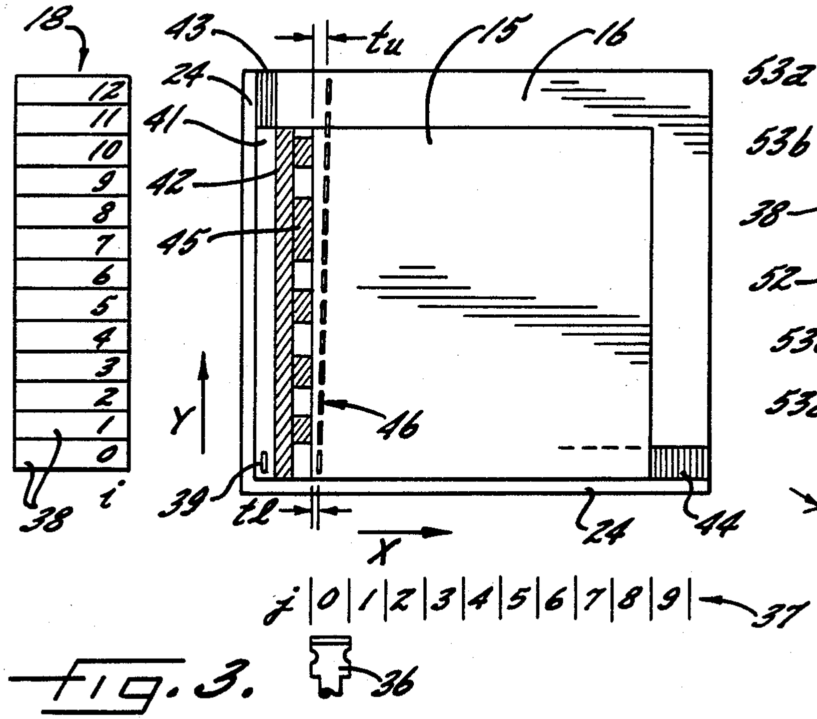
FIG. 3 is a plan view of the printing plate laid on the carriage of the scanner, and also showing the relation of the photo-sensor array and the inking zones of the printing machine with respect to the printing plate.

In accordance with another feature of the invention, the photo-sensing elements of the array 18 are automatically calibrated by sensing areas on the printing plate 15 engraved with known ratios of "printing" to "non-printing" area. As shown in FIG. 3, the photo-sensing array 18 extends along the longitudinal or Y direction along zones of constant ink density metered by mechanical slide valves in the printing machine, such as valve 36. Numerous slide valves 36 extend along the transverse or X direction to define the various inking zones 37, each zone having its ink density adjusted by a respective mechanical slide valve 36. Similarly, the sensor array 18 is made up of a plurality of individual photo-sensing elements 38, each of which scans a strip of the printing plate 15 along the transverse direction. Note, however, that the strips on the printing plate 15 scan by the individual photo-sensing elements 38 are perpendicular to the strips of the printing plate 15 associated with each inking zone 37. Since each inking zone 37 is, in effect, scanned by a plurality of the photo-sensing elements 38, any variation between the average or integrated value for each inking zone 37 is similarly affected by any error in any individual photo-sensing element 38. Hence, it is preferred that the strips of a printing plate 15 scanned by the individual scanners 38 are perpendicular to the inking zones 37. Moreover, the individual resolution elements 39 are in the form of narrow strips oriented along the Y direction. Thus, the array 18 can have a limited number of individual photo-sensing elements 38, yet a high resolution in the X direction is obtained so that the scanner can accommodate various sizes or widths of inking zones 37. For the purpose of analyzing the measured values from the sensors, each sensor 38 is associated with a respective index i and each inking zone 37 is also associated with an index j. As the carriage 16 is driven leftwardly by the stepper motor 19, the sensor array successively scans resolution elements along the X direction. The ratio of "printed" to "non-printed" area is obtained from average values of the outputs of the sensor array 18, or in other words the measured values of the resolution elements 39 are integrated over the index i and the width of each inking zone 37, for each index j.

When the carriage 16 is in its rightmost position and the printing plate 15 is aligned against the lay or guide 24, the sensor array 18 has its resolution elements 39 aligned along a first calibration strip 41. This first strip 41 has no printing areas at all, so that the measured values of the resolution elements 39 along the strip 41 have a minimum reading. After these minimum values are obtained for each individual photo-sensing element 38, the carriage 16 is driven leftwardly so that the sensor array 18 has its resolution elements on a second calibration strip 42 which has a maximum of printed area. Thus, the measured value for the resolution elements 39 have maximum values, since the light from the source 29 is maximally reflected or back-scattered from the printing plate 15 to the sensor 18 by the engravings on the strip 42 of the printing plate 15. It should be noted that automatic calibration can be performed using these minimum and maximum values. The sensor output $S_i$, for example, can be normalized according to:

$$S_i' = \frac{S_i - MIN_i}{MAX_i - MIN_i} \quad (1)$$

Thus the normalized values $S_i'$ range from a value of zero for "non-printed" areas to a maximum value of one for "printed" areas. The normalization procedure, in other words, is a linear transformation for removing the individual offsets of the photo-sensing elements 38 and also for equalizing the linear gain of the individual photo-sensing elements 38.

In accordance with another feature of the present invention, the top surface of the carriage 16 has a reflection capacity which is higher or preferably lower than that of all printing plates to be scanned so that the size of the printed plate 15 may be sensed by the photo-sensing array 18. Preferably the reflection capacity of the carriage 16 is low so that the sensitivity of the array 18 is not degraded or washed out by reflection from the surface of the carriage 16. In the context of the present invention, "reflection capacity" is the ability of the plate 15 or carriage 16 to back scatter incident radiation, and in fact this capacity is lowest when the plate 16 has a mirror finish. It is, however, rather easy to provide a reflection capacity higher than that of all printing plate since, for example, inserts 43 and 44 may be provided having grooves in the Y direction that are beveled to preferentially reflect the light from the incident angle $\theta_i$ to the angle $\theta_i$. For the purpose of detecting the size of the printing plate 15, these areas of high reflection 43, 44 need only be and should only encompass small strips along the Y and X direction in order to determine the X and Y dimensions of the plate 15 in the vicinity of the lay or guide 24. When the first strip 41 is sensed, for example, the sensed values $S_i$ can be compared to a predetermined high or low threshold to determine which of the photo-sensitive elements 38 have resolution elements 39 on the printing plate 15 and conversely which photo-sensing elements 38 have resolution elements 39 on the surface 43. Moreover, the extent of a printing plate 15 in the X direction can be sensed by comparing the normalized value $S_0'$ for the first photo-sensing element 38 (i=0) to a predetermined high or low threshold slightly greater or slightly lower than one or zero, respectively, in order to determine when the resolution element 39 is upon the surface 44 as the carriage 16 is leftwardly driven by the stepper motor 19.

In accordance with another feature of the present invention, the printing plate 15 is engraved with identification information that can be sensed by the sensor array 18. For this purpose the information is provided on a third strip 45 which has "printed" and "non-printed" areas corresponding to the resolution elements 39 for the individual elements 38 of the sensor array 18. The "printed" and "non-printed" areas of the strip 45, for example, correspond to individual resolution elements 39 and are in binary code format representing, for example, the type of ink, machine and order number for the printing plate 15.

Once the individual sensor elements 38 have been automatically calibrated, the size of the plate 15 has been determined and identification information has been read from the printing plate 15, the part of the printing plate 15 corresponding to the inking zones 37 of the printing press are quickly scanned in stairstep fashion. This scanning method permits the plate 15 to be scanned generally continuously as the carriage 16 is leftwardly driven by the stepper motor 19. As the carriage 16 moves leftwardly, the individual elements 38 of the sensor array 18 are sequentially scanned by the microcomputer 20. The scan line 46 of resolution elements for the first scan of the array 18 is shown in FIG. 3. These resolution elements 46 lie along a slightly skewed path since carriage 16 steps slightly leftward between adjacent resolution elements. Thus, the separation $t_l$ between the scan line 46 and the third strip 45 for the lowest sensor element index i is smaller than the separation $t_u$ for the highest sensor element index i. In fact, designating the width of the resolution element as W, the offset in the X direction between adjacent resolution elements 46 is equal to the width W divided by the number of photo-sensing elements 38 in the array 18. By scanning in the stairstep fashion, the microcomputer 20 can easily coordinate both the stepping of the motor 19 and the scanning of the array 18, since the microcomputer 20 repetitively selects the next photo-sensing element 38 in the array 18, measures the light received from the respective resolution element 36, and then steps the stepper motor 19 by a small increment.

Figure 4:
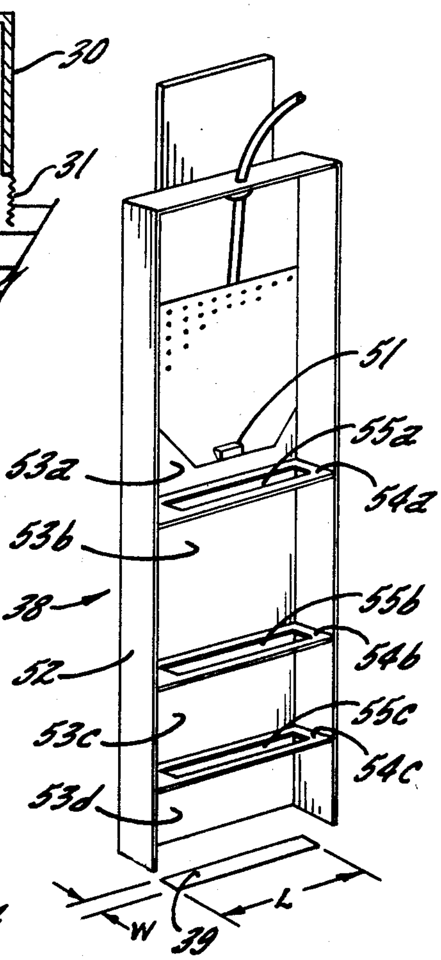
FIG. 4 is a perspective view of one photo-sensor element of the photo-sensor array, shown on an enlarged scale with the front wall of the sensor element removed.

In accordance with another feature of the present invention, the photo-sensing elements of the array 18 are constructed to sense narrow resolution elements 39 having sharply delimited and defied boundaries. As shown in FIG. 4, the photo-sensing element 38 has an electronic photo-sensing device 51 such as a photodiode or photocell disposed within a rectangular channel 52. The channel 52 is divided into a plurality of chambers 53*a*, 53*b*, 53*c*, 53*d* by a plurality of diaphragms 54*a*, 54*b*, 54*c* having rectangular openings 55*a*, 55*b*, 55*c* similar to the geometrical shape of the desired resolution element 39. The resolution element 39 has a very small width W, in order that printing zones 37 of various widths may be properly sensed even though the boundaries of the resolution elements 39 in the Y direction will not necessarily align with boundaries between the printing zones 37 for any arbitrary width of printing zone. The length L of the resolution element 39 should be large in order to reduce the number of photo-sensing elements 38 in the array 18, but it should not be too large or else the photo-sensor 51 will preferentially respond to the middle region of the resolution element 39. Moreover, by using a large number of array elements 38, the effect of nonuniform illumination from the light source 29 along the Y direction is suppressed since each of the photo-sensing elements 38 is automatically adjusted or calibrated to compensate for any variation of illumination along the Y direction. Hence, the number of elements 38 in the array 18 is dictated by a balancing of economy versus performance.

The chambers 53*a*, 53*b*, 53*c*, 53*d* define by the diaphragms 54*a*, 54*b*, 54*c* absorb stray light penetrating the measuring channel 52. In other words, they prevent the photodiode 51 from responding to light that is not reflected from the resolution element 39. The measuring channel 52 and diaphragms 54*a*, 54*b*, 54*c* consists of low-reflection black plastic. To further increase the sharp definition of the resolution element 39, the diaphragms 54 are increasingly separated at greater distances from the resolution element 39. In other words, a sufficient number of progressively spaced diaphragms 54 are provided so that the intensity of reflected and refracted light at the diaphragms assumes an extreme value in proportion to the total light reflected from the printing plate 15 and received by the measuring channel 52.

It should further be noted that by using a resolution element 39 with a small width W the calibration strips 41, 42 and the information strip 45 occupy a minimal area of the printing plate 15. The width of these strips 41, 42, 45, for example, need only be approximately twice the width W of the resolution element 39 to assures alignment of the resolution elements 39 with the strips 41, 42, 45. It should be noted, however, that by using the configuration of FIG. 5 it is possible to both calibrate the photo-sensing elements 38 and also provide the coded information using only two strips 41', 42'.

In the scheme of FIG. 5, each strip 41', 42' has areas of both minimum and maximum "printing" and "non-printing." The microcomputer 20 temporarily stores the measured values for both the first strip 41' and the second strip 42' from each photo-sensing element 38. For each photo-sensing element 38, the microcomputer 20 compares these two values and chooses the minimum value as the smaller value and the maximum value as the larger value. Then the coded information is decoded, one bit for each photo-sensing element 38, by determining whether the first measured value is greater than the second measured value. It should be noted that additional information strips can be provided along the Y direction, or for even higher information density, coded information generally designated 58 can be engraved along the strip in the X direction for the first photo-sensing element 38 (i=0).

Turning now to FIG. 6, there is shown a block diagram of the electrical components generally designated 60 associated with the microcomputer 20. The microcomputer 20 is interfaced to the photo-sensing array 18 in a conventional manner. An array of amplifiers 61 has an individual amplifier 62 for receiving the output of each photo-sensing element 38. The conventional circuit for such an amplifier is shown in FIG. 7. The signal from the photo diode 51 is fed to the negative input of an operational amplifier 63 having its positive input at signal ground. To determine the gain of the operational amplifier 63, a feedback resistor 64 is provided. The voltage output of the operational amplifier 63 is therefore equal to the photo current of the diode 51 multiplied by the resistance of the resistor 64. This gain is selected so that the output of the amplifier 63 ranges through several hundreds of millivolts. A feedback capacitor 65 is also provided to limit the band width of the amplifier 62 and therefore to suppress noise pick up. The time constant of the capacitor 64 and the resistor 65, for example, is set approximately one-half to one-third of the time required for the carriage 16 to be driven leftward through a distance of W or the width of the resolution element 39. The microcomputer 20 selects the desired photo-sensing element 38 by writing the corresponding index i to a select register 66 specifying the select input to an analog multiplexer 67. The analog multiplexer 67 feeds the output of the selected individual amplifier 62 to an analog-to-digital converter 68. Thus, the microcomputer receives, in numerical form, a measure of the light intensity received from the resolution element 39 of the selected photo-sensing element 38. The microcomputer 20 also accepts inputs from the limit switch 22 and the scan switch 23, and sends signals to the stepper motor 19 to drive the carriage 16 right or left, and further activates the light in the scan switch 23. The microcomputer 20 also activates the light source 29 by energizing a relay 69 connecting the 120 VAC power line to either the long wave filament lamps 33 or the short wave gas discharge lamp 32, as selected by the switch 34. The short wave lamp 32 has an associated ballast 32'.

The microcomputer 20 receives the measured values from the sensor array 18 and integrates or averages the sensor values over the longitudinal areas of the printing plate 15 corresponding to the printing zones 37 of the printing machine. These integrated values represent the ratio of the "printing" to the "non-printing" area on the printing plate 15 for the respective inking zones 37. The microcomputer 20 also collects the printing plate identification information and determines the size of the printing plate 15. These then are then transmitted to the control computer 70 associated with the printing machine 71.

Figure 8:
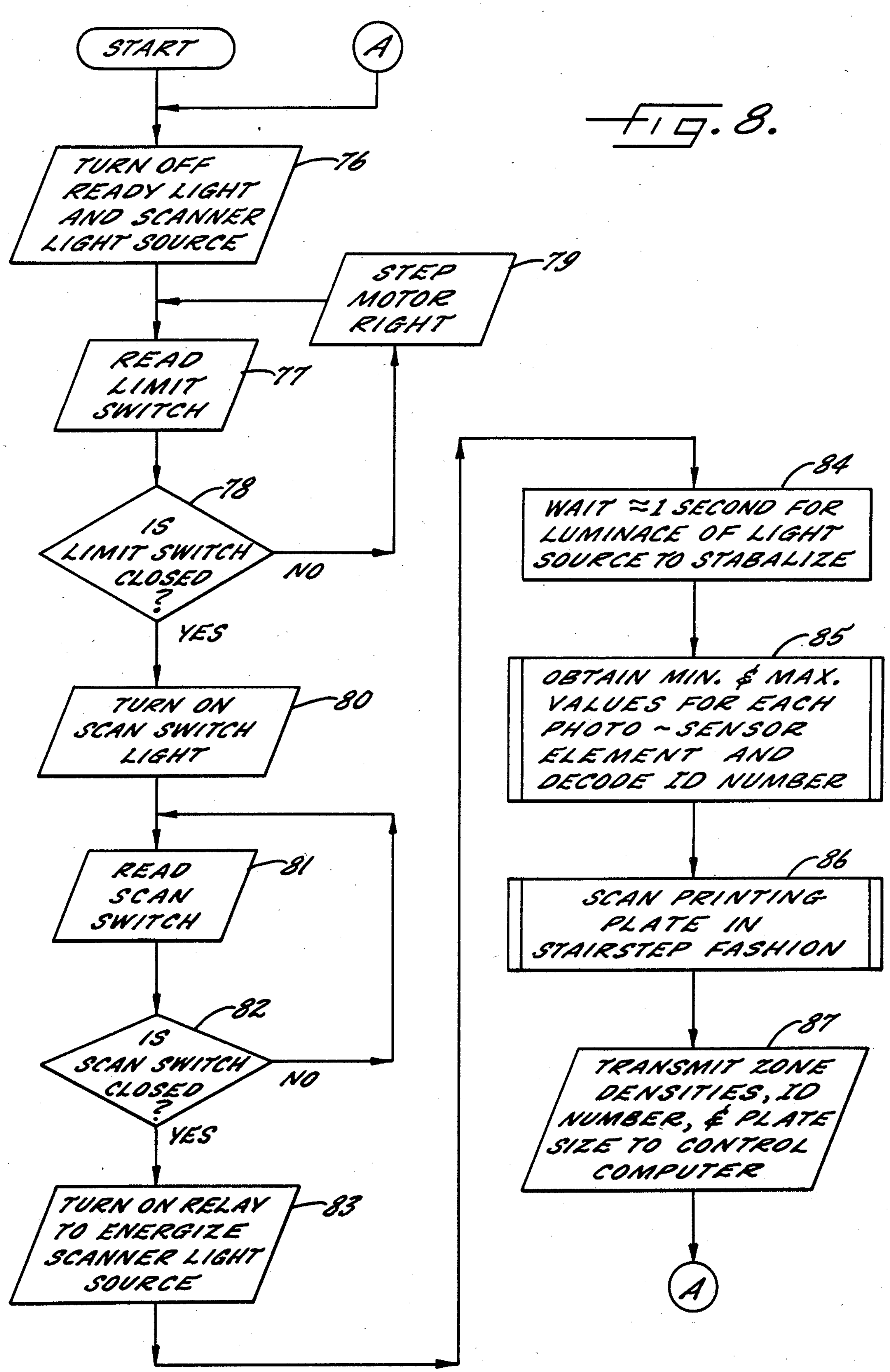
FIG. 8 is a flow chart of an executive program for the microcomputer controlling the scanner according to the invention.

The microcomputer 20 performs its assigned functions as determined by a fixed procedure or sequence of instructions. A flow chart for the executive program portion of the microcomputer's instructions, is shown in FIG. 8. The first step 76 of the executive program instructs the microcomputer 20 to turn off the ready light 23 and the scanner light source 29. Then in step 77 the limit switch 22 is read to determine whether the carriage 16 is in its initial right-most position. In step 78 the limit switch 22 is tested, and if it is not closed, the stepper motor is pulsed in step 79 to drive the carriage to the right. When the limit switch closes, the lamp of the scan switch 23 is turned on in step 80 to inform the printing machine operator that the scanner 14 is ready to accept a printing plate for scanning. After the printing plate 15 is placed on the carriage 16, the machine operator depresses the scan switch 23 to initiate a scanning cycle. The microcomputer 20 successively reads the scan switch 23 in step 81 until it determines in step 82 that the scan switch is closed.

Once the scan switch 23 is closed, a scanning cycle is started in step 83 by turning on the relay 69 to energize the selected scanner light source 32, 33. Then in step 84 the microcomputer waits approximately one second for the luminance of the light source 19 to stabilize. Then, in step 85, a calibration subroutine is executed to obtain minimum and maximum values for each photo-sensor element 38 and to decode the identification number encoded in the first two strips 41' and 42' (FIG. 5) on the printing plate 15. The calibration subroutine in step 85 also determines the size of the printing plate in the longitudinal Y direction to a resolution of one length L of the resolution elements 39.

The actual scanning of the printing plate 15 to determine the ratio of "printed" to "non-printed" area for each inking zone 37 is performed by calling a scan subroutine in step 86. The scan subroutine scans the printing plate 15 in the stairstep fashion 46 and also determines the size of the printing plate 15 along the traverse or X direction. Motion of the carriage 16 and scanning of the plate 15 terminates, in fact, once the transverse dimension of the printing plate 15 is determined. Thus, in step 87 the zone densities, printing plate identification number, and plate size are transmitted to the control computer 70. Execution then returns to the first step 76 of the executive program in order to return the carriage 16 to its original position for another scanning cycle.

Figure 9:
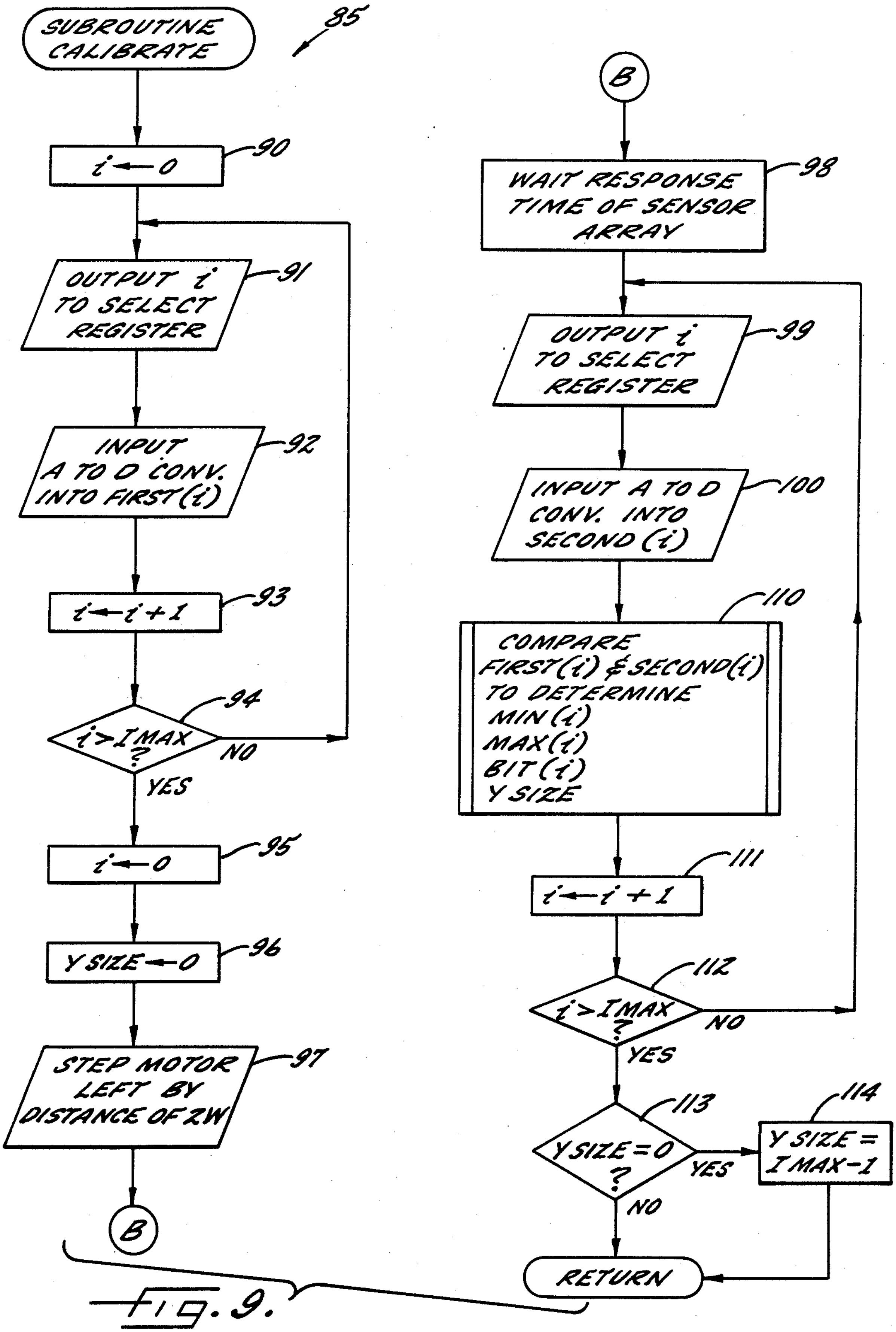
FIG. 9 is a flow chart of the calibration subroutine called by the executive program of FIG. 8 to obtain minimum and maximum values for each photo-sensor element and to decode the identification number engraved on the printing plate of FIG. 5.

Shown in FIG. 9 is a flow chart for the calibration subroutine called in step 85 of FIG. 8. The calibration subroutine presumes that the scanner array 18 is directed to the first strip 41' in FIG. 5. In step 90 the sensor index i is set to zero in order to start scanning in the Y direction. The index i is sent to the select register 66 in step 91 so that the analog-to-digital converter 68 generates a numeric measured value of the light received by the ith element of the sensor array 18. Therefore in step 92, the analog-to-digital converter 68 is read into the ith element of an array FIRST for temporarily storing the measured values corresponding to the first strip 41'. In step 93 the index i is incremented and in step 94 the index i is compared to the maximum index value IMAX (being 15 in FIG. 3) in order to test whether the entire sensor array 18 has been scanned. Scanning continues until the index i is greater than the maximum IMAX.

Once scanning of the first strip 41' has been completed the index i is set to zero in step 95 and a variable YSIZE is set to zero in step 96 in anticipation of scanning the second strip 42' and determining the proper value for the longitudinal size YSIZE of the printing plate 15. In step 97 the motor 19 is stepped leftward by a distance of twice the width W of a resolution element 39 in order that the sensor 18 becomes positioned over the second strip 42. In step 17 the microcomputer 20 waits for a sufficient time for the stepper motor 19 to respond and for the sensor array 18 to register the change in received light intensity.

The second strip 42' is scanned in step 99 by writing the index i to the select register 66. The new measured value is received from the analog-to-digital converter 68 in step 100 and fed into the ith element of the array SECOND. In step 110 a comparison subroutine is called to compare the ith elements of the FIRST and SECOND arrays to determine the ith element of a minimum array MIN, a maximum array MAX, an information bit array BIT, and the proper value of the longitudinal or Y dimension YSIZE of the printing plate 15. In step 111 the index i is incremented and in step 112 the index i is compared to the maximum value IMAX to determine whether the entire second strip 42 has been scanned, and if so, calibration is finished. But in step 113 YSIZE is tested for the case of a maximum sized printing plate 15. If YSIZE is zero, YSIZE is set in step 114 to a maximum size of (IMAX-1).

Figure 10:
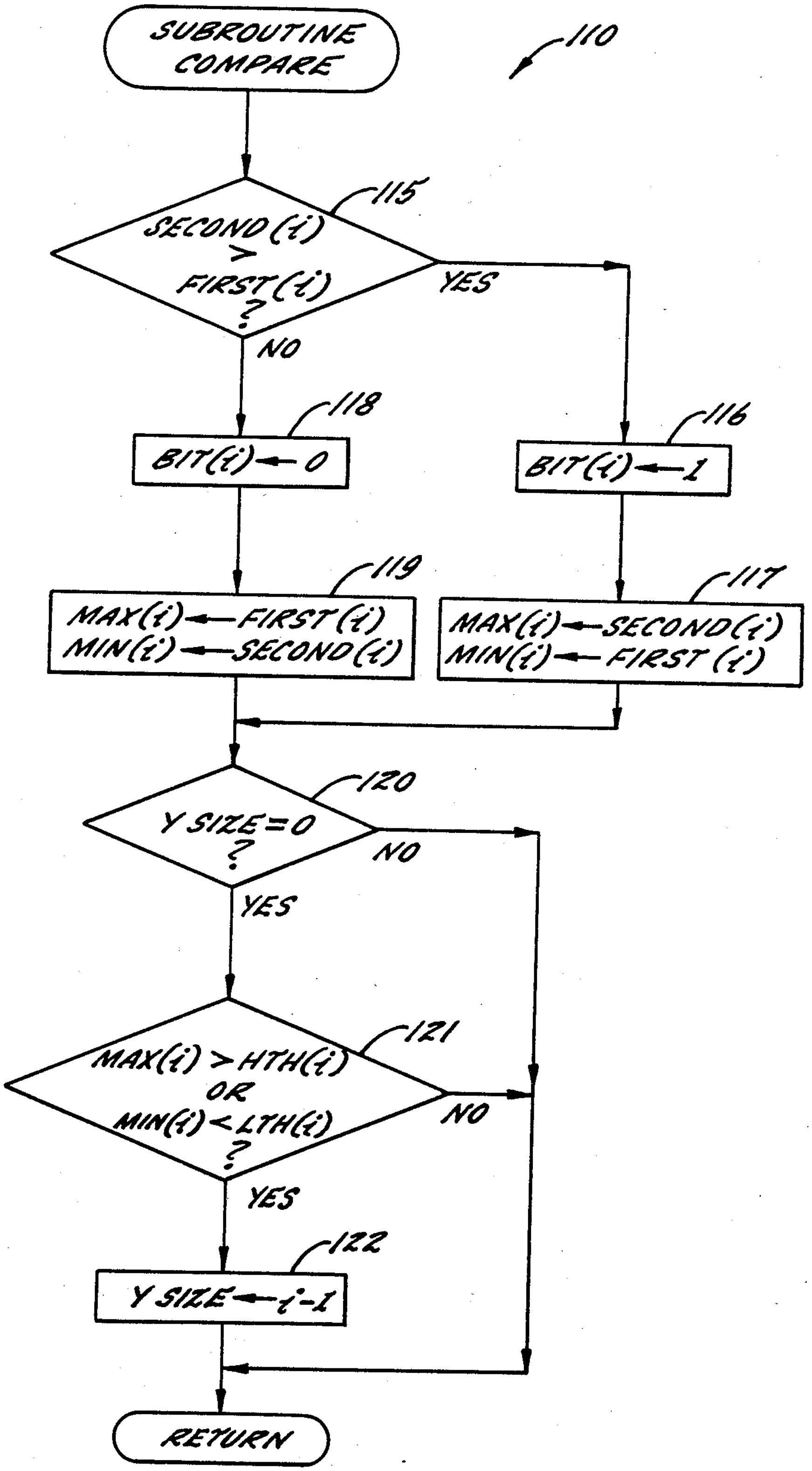
FIG. 10 is a flow chart of the comparison subroutine called by the calibration subroutine of FIG. 9 to compare the first and second sensor values to determine which of the first or second values is the minimum and maximum value, and to decode the identification information and to calculate the size of the printing plate in the longitudinal direction.

The comparison subroutine called in step 110 of FIG. 9, is shown in FIG. 10. In step 115 the ith elements of the FIRST and the SECOND arrays are compared. If the respective element of the SECOND array is greater than the element of the FIRST array, then the corresponding element of the BIT array is set equal to one in step 116 and in step 117 the respective element of the SECOND array is copied into the corresponding element of the MAX array and the respective element of the FIRST array is copied into the MIN array. Conversely, if the ith element of the SECOND array is greater than the respective element of the FIRST array, then in step 118 the corresponding element of the BIT array is set to zero and in step 119 the respective element of the FIRST array is copied into the corresponding element of the MAX array and the respective element of the SECOND array is copied into the corresponding element of the MIN array.

In step 120 the variable YSIZE is compared to zero to determine if the size of the printing plate 15 has already been determined. If it has already been determined, then the comparison subroutine is finished. Otherwise, in step 121, the ith element of the maximum array MAX is compared to the corresponding element of a predetermined high threshold array HTH or the ith element of the MIN array is compared to the corresponding element of a predetermined low threshold array LTH (depending on whether the top of the carriage 16 has a higher reflectivity or a lower reflectivity than all printing plates, respectively) to determine whether the ith photo-sensing element 38 has its corresponding resolution element 39 on the surface of the carriage 16. If not, then the comparison subroutine is finished. Otherwise, the longitudinal size of the printing plate YSIZE is calculated in step 122 as one less than the value of the index i, and the comparison subroutine is finished.

Figure 11:
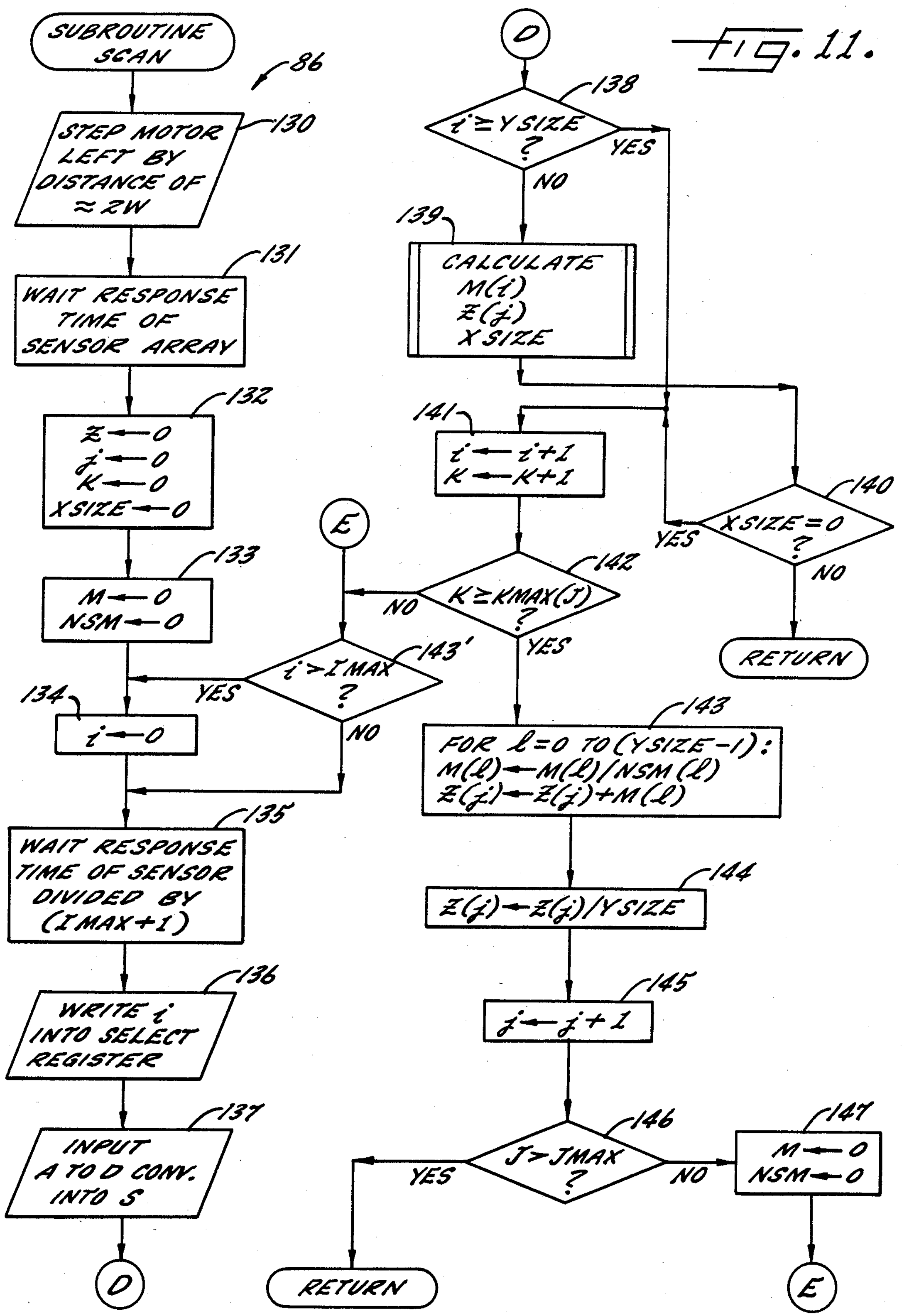
FIG. 11 is a flow chart of the scanning subroutine called by the executive program of FIG. 8 to scan the printing plate in stairstep fashion.

A flow chart of the scan subroutine called in step 86 (FIG. 8) is shown in FIG. 11. In step 130, the stepper motor 19 is pulsed to drive the carriage 16 left by a distance of twice the width W of a resolution element 39. The microcomputer 20 then waits in step 131 for the sensor array 18 to respond to any change in received light intensity. In step 132 an array Z for storing the integrated measured values for each inking zone 37 is cleared and the inking zone index j is cleared. Also, a position counter K denoting the current total number of stairsteps in the stairstep scanning process is set to zero along with a variable XSIZE for storing the size of the printing plate 15, indicated in transverse resolution units W, is also cleared.

In step 133 an array M for integrating or averaging in the transverse X direction for each strip sensed by each photo-sensing element 38, is cleared along with a counter array NSM denoting the number of measured values summed into each corresponding element of the integrating array M. In step 134 the photo-sensing element index i is cleared.

For each iteration or stairstep in the scanning process, the total time delay of the loop, represented by step 135, is approximately the response time of the sensor, or the time for the carriage 16 to move leftward by one transverse resolution unit W, divided by the number of sensor elements or steps per scan 46 along the longitudinal Y direction, computed as (IMAX+1). Then in step 136 the value of the index i is written into the select register 66 and in step 137 the measured value from the ith sensor element 38 is written into a sample variable S. In step 138 the value of the index i is compared to the longitudinal size YSIZE of the printing plate 15 and if the index i is greater or equal to YSIZE, then calculations in step 139 are bypassed. In other words, for sensor elements 38 reading off the printing plate 15 (e.g., element i=14 and 15 in FIG. 3), the measured values are not integrated to determine the ratios of "printed" to "non-printed" areas on the printing plate 15.

In step 139 the ith element of the M array and the jth element of the Z array are updated and, if possible, the transverse size of the printing plate XSIZE is determined. In step 140 the value of XSIZE is compared to zero to detect whether the entire plate 15 has been scanned in order to terminate scanning as soon as possible. If XSIZE is not equal to zero, the scanning is complete and the subroutine SCAN is finished. Otherwise, in step 141 the sensor element index i and the step counter K are incremented.

In step 142 the step counter K is compared to a maximum value dependent upon the zone index j. KMAX, in other words, is an array of the boundaries between the printing zones 37 in terms of the number of steps from the left boundary of the first inking zone 37 for which the index j equals zero. Due to the fact that the sensor array 18 scans the printing plate 15 in a stairstep fashion, the sensing of the ratio of "printed" to "non-printed" area on the printing plate for each zone 37 can stop at arbitrary boundaries in terms of the steps in the X direction rather than in terms of resolution elements W in the X direction. Thus, the stairstep scanning reduces the maximum quantization error due to the limited resolution W in the X direction by a factor of about one-half. If the position counter K is not greater than or equal to the maximum KMAX (j), then execution proceeds to step 143' for testing of whether the index i is greater than the maximum value IMAX. If it is greater than the maximum value, then scanning along one longitudinal scan line 46 is completed and the index i is set to zero in step 134 to begin scanning of another line 46. Otherwise, execution proceeds with step 135 to step to the next resolution element in the current scan line 46.

If in step 142 the step counter K was found to be greater or equal to the boundary KMAX (j), then in step 143 all of the elements of the summing arrays M are normalized by dividing by the respective number of samples NSM added into the respective M array elements, and then the normalized values of M are summed in the current element of the Z or zonal array. Thus, the measured values first integrated in the X direction in the M array are integrated in the Y direction into the current element of the Z array. In step 144 the integration into the current element of the Z array is normalized by dividing by YSIZE, YSIZE being the number of M array elements summed into the current Z element. Thus, the calculations for the current Z element have been completed. Therefore, in step 145 the index j of the Z array is incremented. In step 146 the index j is compared to a predetermined maximum JMAX, and if it is greater than the maximum, then execution of the scan routine is finished. Otherwise, in step 147 the M array is cleared and also the number of samples in the M array, NSM, is also cleared. After step 147, execution proceeds with step 143.

Figure 12:
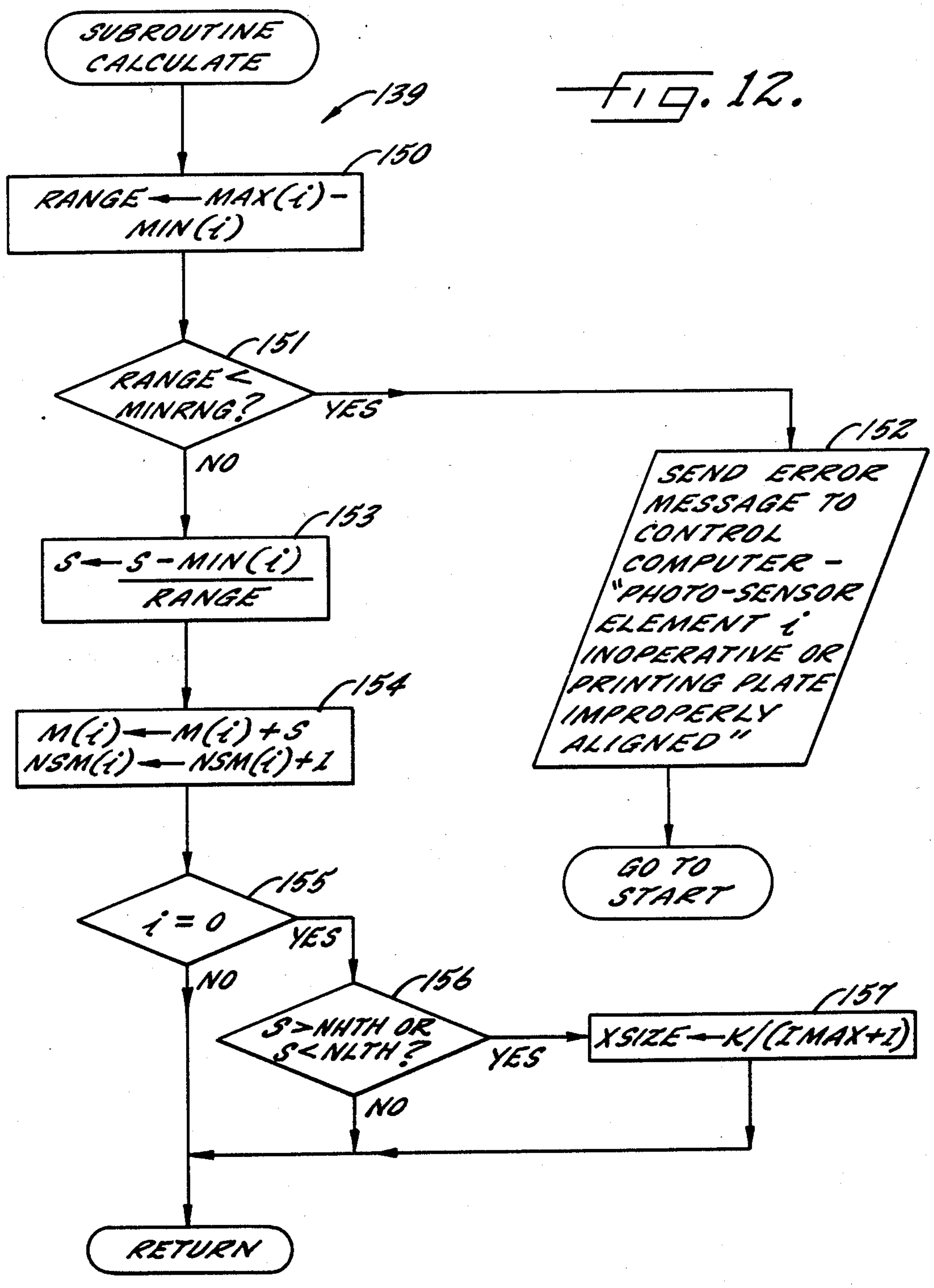
FIG. 12 is a flow chart of the calculation subroutine called by the scan subroutine of FIG. 11 to calculate the ratio of "printing" to "non-printing" area of the printing plate for each of the ink zones of the printing press, and to determine the transverse size of the printing plate.

A flow chart for the calculation subroutine called in step 139 of FIG. 11, is shown in FIG. 12. In the first step 150, the range (RANGE) between the maximum and minimum calibration elements is computed. In order to detect failure of the ith photo-sensor element 38, or to determine whether the printing plate 15 was improperly aligned on the carriage 16, RANGE is compared to a predetermined minimum range MINRNG, and if RANGE is less than MINRNG, as tested in step 151, an error message is sent in step 152 to the control computer 70 for display to the printing machine operator. Otherwise, in step 153 the actual normalization or automatic calibration of the ith sensor element 38 is performed by subtracting the corresponding minimum value MIN(i) from the measured value S and dividing by the total range (RANGE) for the corresponding sensor element. Thus, the value of S is normalized to have a value of approximately 0 to 1. In step 154 the normalized value is accumulated into the M array and the number of accumulations NSM is incremented.

In step 155 the sensor element index i is compared to zero to determine whether it is time to test for the transverse or X dimension of the printing plate 15. If the index i does not have a value of zero then the calculation subroutine is finished. Otherwise, in step 156, the normalized measured value S is compared to a predetermined normalized high threshold NHTH or is compared to a predetermined normalized low threshold NLTH, depending upon whether the reflectivity of the top of the carriage 16 is greater, or less, respectively, than the reflectivity of any printing plate 15. If the value of S is out of the bound set by either the high or low normalized threshold, respectively, then in step 157 the size of the printing plate 15 in the transverse or X direction is computed as the value of the step counter K divided by the quantity (IMAX+1). Note that this division should result in an integral value for XSIZE, representing a whole number of transverse resolution units W. This completes the description of the instruction sequence executed by the microcomputer 20 to scan the printing plate 15, analyze the data, and transmit the results to the remote control computer 70.

We claim:

1. A scanner for scanning a printing plate to determine the ratio of "printed" to "non-printed" area for the respective inking zones of a printing machine using the printing plate, the machine having a light source and a linear array of photo-sensing elements disposed along a line, said photo-sensing elements receiving light from the source reflected at respective defined resolution elements on the surface of the printing plate, the machine having means for imparting relative motion between the printing plate and the sensor array in a direction substantially perpendicular to said line so that the defined areas on the surface of the printing plate are swept across the printing plate, wherein the improvement comprises, the photo-sensing elements in the array each comprising an electronic photo-sensing device, enclosed within and elongated channel defining an elongated light transmission path extending between the photo-sensing device and the respective resolution element, the channel being divided into a plurality of chambers by diaphragms, the channel and diaphragms being made of low-reflection material.

2. The scanner as claimed in claim 1, wherein the number of diaphragms is at least three, and the spacing between the diaphragms is increased for diaphragms closer to the photo-sensing device than to the respective resolution element on the printing plate.

3. The scanner as claimed in claim 2, wherein the channel, the diaphragms, and the respective resolution element on the printing plate are rectangular and are elongated in the direction of said line.

4. The scanner as claimed in claim 1, wherein the channel, the diaphragms, and the respective resolution element on the printing plate are rectangular, and are elonagted in the direction of said line, and wherein the printing plate is scanned in stairstep fashion at the respective resolution elements of sequentially selected photo-sensing elements in the array.

5. The scanner as claimed in claim 1 further comprising means for selecting a limited optical spectrum for scanning the printing plate in accordance with the material of the printing plate.

6. The scanner as claimed in claim 1 wherein the light source comprises at least one long-wave filament lamp, a short-wave discharge lamp, and means for selectively activating either the long-wave lamp or the short-wave lamp.

7. The scanner as claimed in claim 1, wherein the array of photo-sensing elements is directed at an angle of reflection of 60 degrees to 45 degrees with respect to the normal vector of the printing plate at the resolution elements, and the light source is in the same quadrant as the array, with respect to the plane of the printing plate and said normal vector, so that the array predominantly receives back-scattered light from the light source.

8. The scanner as claimed in claim 1, further comprising automatic means for calibrating the response of the individual photo-sensing devices.

9. The scanner as claimed in claim 1, further comprising automatic means for determining the size of the printing plate by analysis of the outputs of the photo-sensing devices.

10. The scanner as claimed in claim 1, futher comprising automatic means responsive to the outputs of the photo-sensing devices for decoding printing plate identification information engraved on the printing plate.

11. A scanner for scanning a printing plate to determine the ratio of "printed" to "non-printed" area for the respective inking zones of a printing machine using the printing plate, the machine having a light source and a linear array of photo-sensing elements disposed along a line, said photo-sensing elements receiving light from the source reflected at respective defined resolution elements on the surface of the printing plate, the machine having means for imparting relative motion between the printing plate and the sensor array in a direction substantially perpendicular to said line so that the defined areas on the surface of the printing plate are swept across the printing plate, wherein the improvement comprises, the array of photo-sensing elements is directed at an angle of reflection of 60 degrees to 45 degrees with respect to the normal vector of the printing plate at the resolution elements, and the light source is in the same quadrant as the array, with respect to the plane of the printing plate and said normal vector, so that the array predominantly receives back-scattered light from the light source.

12. The scanner as claimed in claim 11, further comprising means for selecting a limited optical spectrum for scanning the printing plate in accordance with the material of the printing plate.

13. The scanner as claimed in claim 11, wherein the light source comprises at least one long-wave filament lamp, a short-wave discharge lamp, and means for selectively activating either the long-wave lamp or the short-wave lamp.

14. The scanner as claimed in claim 11, further comprising automatic means for calibrating the response of the individual photo-sensing elements in the array.

15. The scanner as claimed in claim 11, further comprising automatic means for determining the size of the printing plate in response to the outputs of the individual photo-sensing elements in the array.

16. The scanner as claimed in claim 11, further comprising automatic means, responsive to the output of at least one of the photo-sensing elements, for decoding printing plate identification information engraved on the printing plate.

17. A scanner for scanning a printing plate to determine the ratio of "printed" to "non-printed" area for the respective inking zones of a printing machine using the printing plate, the machine having a light source and a linear array of photo-sensing elements disposed along a line, said photo-sensing elements receiving light from the source reflected at respective defined resolution elements on the surface of the printing plate, the machine having means for imparting relative motion between the printing plate and the sensor array in a direction substantially perpendicular to said line so that the defined areas on the surface of the printing plate are swept across the printing plate, wherein the improvement comprises, the photo-sensing elements in the array each comprise an electronic photo-sensing device enclosed within an elongated channel defining an elongated light transmission path extending between the photo-sensing device and the respective resolution element, and automatic means, responsive to the output of at least one of the photo-sensing elements, for decoding printing plate identification inforamtion engraved on the printing plate.

* * * * *